(12) United States Patent
Krüger et al.

(10) Patent No.: US 11,328,573 B1
(45) Date of Patent: May 10, 2022

(54) METHOD AND SYSTEM FOR ASSISTING A PERSON IN ASSESSING AN ENVIRONMENT

(71) Applicant: Honda Research Institute Europe GmbH, Offenbach/Main (DE)

(72) Inventors: Matti Krüger, Offenbach (DE); Michael Gienger, Offenbach (DE); Martin Weigel, Offenbach (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 0 days.

(21) Appl. No.: 17/084,645

(22) Filed: Oct. 30, 2020

(51) Int. Cl.
*G08B 19/00* (2006.01)
*G08B 21/18* (2006.01)
(Continued)

(52) U.S. Cl.
CPC .............. *G08B 21/18* (2013.01); *G08B 7/00* (2013.01); *H04W 4/33* (2018.02); *H04W 4/38* (2018.02)

(58) Field of Classification Search
CPC .... G06F 3/04842; G06F 3/0486; G06F 3/013; G06F 3/0482; G06F 3/04817; G06F 3/165; G06F 3/011; G06F 3/017; G06F 3/04815; G06F 2203/04803; G06F 3/0483; G06F 3/04855; G06F 16/43; G06F 16/953; G06F 1/1686; G06F 2203/0381; G06F 2203/04802; G06F 3/0304; G06F 3/04845; G06F 3/0485; H04M 1/6016; H04M 1/72469; H04M 2250/22; H04N 7/147; H04N 7/15; H04N 7/142; H04N 7/144; H04N 5/2328; H04S 2420/01; H04S 7/302; H04S 7/304; B25J 5/007; B25J 9/1697; B25J 9/0003; B25J 11/009; B25J 19/023; B25J 9/0006; B25J 9/104; G05D 1/0255; G05D 1/0274; G05D 2201/0206;
(Continued)

(56) References Cited

U.S. PATENT DOCUMENTS 10,051,253 B1 * 8/2018 Monastyrshyn ....... G06V 10/60
2010/0325563 A1 * 12/2010 Goldthwaite ....... G06F 3/04815
715/757

(Continued)

OTHER PUBLICATIONS

Jan B. F. Van Erp, et al., "Waypoint Navigation with a Vibrotactile Waist Belt," ACM Transactions on Applied Perception, Apr. 2005, pp. 106-117.
(Continued)

*Primary Examiner* — Daniel Previl
(74) *Attorney, Agent, or Firm* — JCIPRNET

(57) ABSTRACT

The disclosure regards a method and a system for assisting a person in assessing an environment. The method includes selecting a set of one or more entities present in the environment, obtaining coordinates in the environment and extents of each entity of the set, estimating a location and shape of each entity of the set on the basis of the obtained coordinates and extends of the respective entity, determining an area of interest on the basis of the estimated location and shape of each entity of the set, evaluating the area of interest with respect to one or more variables of interest in order to evaluate a deviation between a current state of the area of
(Continued)

interest and a target state, and communicating the deviation from the target state to the person using coherent stimuli for stimulating the person's body.

18 Claims, 8 Drawing Sheets

(51) Int. Cl.
*H04W 4/33* (2018.01)
*H04W 4/38* (2018.01)
*G08B 7/00* (2006.01)

(58) Field of Classification Search
CPC ......... G05D 2201/0211; G05D 1/0251; G05D 2201/0203; G05D 2201/0216; G05D 1/0011; G05D 1/0022; G05D 1/0038; G05D 1/0227; G05D 1/024; G05D 1/0242; G05D 1/0246; G05D 1/027; G05D 1/0272; G02B 2027/014; G02B 2027/0178; G02B 2027/0187; G02B 27/017; B65G 2203/041; G05B 2219/39387; G06K 9/3233; G06K 9/627; G06K 9/00281; G06K 9/4628; G06K 9/66; G06K 9/00355; G06K 9/00375; G06K 9/00389; G06K 9/00671; G06K 9/2018; G06K 9/6264; Y10S 901/01; Y10S 901/47; G06N 3/0436; G06N 3/0454; G06N 7/005; G06N 3/006; G06N 5/043; G09B 5/00; G09B 7/00; G09B 19/00; G09B 23/28; G09B 23/30; G09B 5/02; G09B 5/06; G09B 7/08; A61B 5/163; A61B 5/165; A61B 5/4803; A61B 5/7221; A61B 5/7267; G01S 3/7864; G06T 7/20; G06T 15/506; G06T 19/20; G06T 2219/2012; G06T 2219/2021; G16H 20/40; G16H 30/40; G16H 50/50; G16H 50/70; A61F 2005/0144; A61F 2/72; A61F 5/0102; A61H 2201/1602; A63B 71/1225; G06Q 10/10
USPC ........... 340/521, 520, 515, 517, 525, 539.11, 340/539.26, 539.27, 539.22, 539.12, 566, 340/588
See application file for complete search history.

(56) References Cited

U.S. PATENT DOCUMENTS

| | | | |
|---|---|---|---|
| 2012/0025964 A1* | 2/2012 | Beggs | G08B 21/18 340/435 |
| 2015/0317449 A1* | 11/2015 | Eder | G16H 20/17 600/595 |
| 2018/0336797 A1* | 11/2018 | Bergh | G09B 19/0038 |
| 2019/0101977 A1* | 4/2019 | Armstrong-Muntner | G06F 3/017 |
| 2020/0138356 A1* | 5/2020 | Sharon | A61B 5/168 |
| 2020/0387245 A1* | 12/2020 | Chen | G06F 3/0202 |

OTHER PUBLICATIONS

Alvaro Cassinelli, et al., "Augmenting spatial awareness with the Haptic Radar," 2006 10th IEEE International Symposium on Wearable Computers, Oct. 2006, pp. 1-6.

Sylvain Cardin, et al., "Wearable System for Mobility Improvement of Visually Impaired People," The Visual Computer, Jan. 2007, pp. 1-11.

Martin Pielot, et al., "Where is my Team? Supporting Situation Awareness with Tactile Displays," CHI '10: In Proceedings of the SIGCHI Conference on Human Factors in Computing Systems, Jan. 2010, pp. 1-11.

Alex Díaz, et al., "Action-contingent vibrotactile flow facilitates the detection of ground level obstacles with a partly virtual sensory substitution device," Human Movement Science, vol. 31, Aug. 2012, pp. 1-38.

Atsuo Murata, et al., "Proposal of Automotive 8-directional Warning System That Makes Use of Tactile Apparent Movement," International Conference on Digital Human Modeling and Applications in Health, Safety, Ergonomics and Risk Management, Jan. 2013, pp. 98-107.

Basil Wahn, et al., "Multisensory teamwork: using a tactile or an auditory display to exchange gaze information improves performance in joint visual search," Ergonomics, Nov. 2015, pp. 1-27.

Ke Ma, et al., "Body-ownership for actively operated non-corporeal objects," Consciousness and Cognition, Jun. 2015, pp. 75-86.

H Henrik Ehrsson, "How many arms make a pair? Perceptual illusion of having an additional limb," Perception, vol. 38, Feb. 2009, pp. 1-4.

* cited by examiner

METHOD AND SYSTEM FOR ASSISTING A PERSON IN ASSESSING AN ENVIRONMENT

TECHNICAL FIELD OF THE DISCLOSURE

The present disclosure relates to a method for assisting a person in assessing an environment and to a system for assisting a person in assessing an environment. In particular, the present disclosure relates to a system configured to perform such a method.

BACKGROUND

Examples of potential application domains/areas comprise transportation, control of surgical robots, assembly tasks, relocation, forklift operation, grocery shopping, traffic control, social distancing etc.

Human sensory and cognitive capabilities have evolved to recognize one's own physical extents in relation to the environment. The ability of a person to handle objects thereby has expanded the perceptual capabilities of the person to also encompass objects used as tools. However, limits of the human sensory apparatus put constraints on e.g. the form, size and opacity, which such objects may have to allow for safe handling.

Various tasks, such as the assembly of large objects like vehicles, or work on a construction site involve the handling of objects, which may be bulky or have shapes that may be difficult to grasp physically, perceptually and mentally. In addition to carrying out the possibly complex task, which involves the respective object, the person handling it has to devote resources to ensuring that the object does not endanger people, itself and other objects or otherwise negatively interferes with events taking place in often highly dynamic environments. That is, the person is less focused on the possibly complex task because of handling the respective object. Furthermore, personal sensory impairments may prevent an individual from safely carrying out tasks, which involve the handling of objects, such as large or complexly shaped objects. When operating in mixed-reality or telepresence settings (e.g. teleoperating a robot) such issues can be amplified due to insufficient or ambiguous feedback from available interfaces (e.g. lack of depth information from a scene representation on a 2D screen).

Therefore, it is an objective of the present disclosure to provide a method and system for assisting a person in assessing an environment to support the person's awareness for entities, which the person interacts with in order to achieve higher safety, ease and comfort during handling or interaction. A further objective of the present disclosure is to expand entity constraints imposed by a person's (human's) limited perceptual capabilities by incorporating information acquired through sensors and processing capabilities.

SUMMARY

The present disclosure provides a method and a system for assisting a person in assessing an environment.

The method according to the disclosure for assisting a person in assessing an environment includes selecting a set of one or more entities present in the environment, obtaining coordinates in the environment and extents of each entity of the set, estimating a location and shape of each entity of the set on the basis of the obtained coordinates and extents of the respective entity, determining an area of interest on the basis of the estimated location and shape of each entity of the set, wherein the area of interest encompasses at least a part of each entity of the set, evaluating the area of interest with respect to one or more variables of interest in order to evaluate a deviation between a current state of the area of interest and a target state, and communicating the deviation from the target state to the person using coherent stimuli for stimulating the person's body.

The system according to the disclosure for assisting a person in assessing an environment includes a processing unit, a sensor unit, and a communication unit. The processing unit is configured to select a set of one or more entities present in the environment. The sensor unit includes one or more sensors and is configured to obtain coordinates in the environment and extents of each entity of the set. The processing unit is also configured to estimate a location and shape of each entity of the set on the basis of the obtained coordinates and extends of the respective entity, determine an area of interest on the basis of the estimated location and shape of each entity of the set, and evaluate the area of interest with respect to one or more variables of interest in order to evaluate a deviation between a current state of the area of interest from a target state, where the area of interest encompasses at least a part of each entity of the set. The communication unit is configured to communicate the deviation from the target state to the person using coherent stimuli for stimulating the person's body.

DETAILED DESCRIPTION

Figure 1:
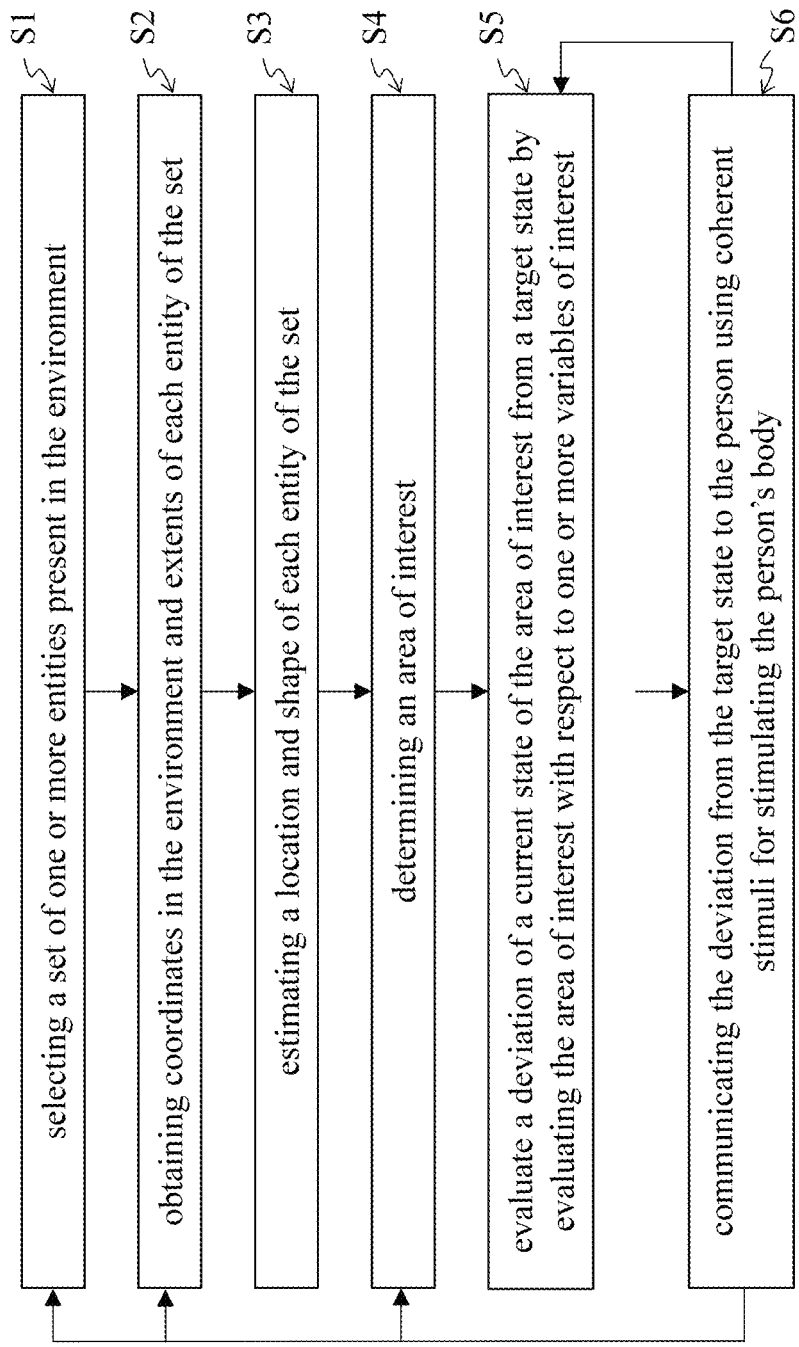
FIG. 1 shows a simplified flowchart illustrating the main steps of the inventive method.

The present disclosure is in the field of environmental/spatial awareness support systems. Potential application domains/areas of the method and system according to the present disclosure comprise any domain in which the location and spatial arrangement of one or more entities associated with a person are subject to geometrical constraints (real or virtual) or have an influence on at least one target such as the safety of entities in the environment. The one or more entities may be controlled and/or operated by the person, carried by the person, connected to the person, supervised by the person, or otherwise associated with the person.

The first aspect of the present disclosure provides a method for assisting a person in assessing an environment, includes selecting a set of one or more entities present in the environment, obtaining coordinates in the environment and extents of each entity of the set, estimating a location and shape of each entity of the set on the basis of the obtained coordinates and extents of the respective entity, determining an area of interest on the basis of the estimated location and shape of each entity of the set, wherein the area of interest encompasses at least a part of each entity of the set, evaluating the area of interest with respect to one or more variables of interest in order to evaluate a deviation between a current state of the area of interest and a target state, and communicating the deviation from the target state to the person using coherent stimuli for stimulating the person's body.

In other words, for assisting the person in assessing the environment, the present disclosure proposes determining an area of interest on the basis of the estimated location in the environment and shape of each entity of the selected set and then to evaluate a deviation of a current state of the area of interest from a target state. The deviation from the target state is communicated to the person using coherent stimuli for stimulating the person's body.

Coherent stimuli for stimulating the person's body are to be understood as stimuli that are configured to stimulate one or more sensory systems of the different sensory systems of the person. The term "coherent stimuli" may also be referred to by the term "stimuli". The terms "human", "human being" and "person" may be used as synonyms. The sensory systems of a person comprise the sensory system for vision (comprising the eyes), the sensory system for hearing (comprising the ears), the sensory system for touch (comprising frequency, pressure, temperature and pain), the sensory system for balance, the sensory system for taste (comprising the tongue) and the sensory system for smell (comprising the nose). Therefore, stimulating a person's body corresponds to stimulating one or more of the sensory systems of the person. That is, a person's body is to be understood as the whole frame of the person, including the person's head. The sensory system for touch of a person comprises the sensory system for frequency, the sensory system for pressure, the sensory system for temperature and the sensory system for pain. Thus, a person is able to sense, via its sensory system for touch, a frequency, pressure, temperature and pain.

As a result, the person's awareness of the one or more entities is increased. Namely, instead of evaluating a deviation between a current state of a single entity and a target state, a deviation between a current state of an area of interest, determined based on the one or more entities of the selected set, and a target state is evaluated.

For example, in case the one or more entities correspond to two entities that correspond to the person and a physical object (real object) associated with the person, e.g. the person carries a box: The present disclosure does not propose evaluating a current state of the person or the associated box with a target state. For example, the target state may be an allowable minimum distance between the respective entity and an obstacle, such as a further entity, and the current state may be the distance between the respective entity and the obstacle. In contrast, the present disclosure proposes to determine an area of interest encompassing at least a part of the person and the physical object associated with the person. As a result, the person's awareness of itself and the associated box is increased. Therefore, when the person carries the box in a narrow hallway and neither the person nor the box should contact the sidewalls of the hallway, the method according to the first aspect is advantageous. Namely, the area of interest may encompass in such a case the person itself and the box carried by the person. The box expands the physical space that is occupied by the person.

As a result of determining the area of interest encompassing the person itself and the carried box the evaluation of the current state of the area of interest with the target state considers both the person's location and shape as well as the location and shape of the carried box. Therefore, the method of the first aspect assists the person in assessing the environment by providing feedback via the coherent stimuli to the person on whether there is a risk of the person itself or the carried box hitting a sidewall of the hallway because of a movement.

In case only the location and shape of the person are used for assisting the person in assessing the environment, only a risk of the person itself hitting a sidewall of the hallway because of motion would be determined. Thus, the coherent stimuli could communicate the deviation of the current state (e.g. distance between person and obstacles, such as sidewalls of hallway) of the person from the target state (e.g. allowable minimum distance between person and obstacles, such as sidewalls of the hallway) for assisting the person in assessing an environment. As a result, the person may adapt its movement in accordance with these coherent stimuli. However, this would only help for preventing the person hitting a sidewall of the hallway. The box carried by the person could still hit a sidewall because of the person's movement, in case only the location and shape of the person are used for assisting the person in assessing the environment. The same applies in case of only using the location and shape of the carried box for assisting the person in assessing the environment.

That is, the present disclosure proposes not directly using the location and shape of one or more entities present in an environment for assisting a person in assessing the environment. In contrast, the present disclosure proposes to select a set of one or more entities present in the environment and determining a common area of interest on the basis of the location and shape of each entity of the set. The area of interest encompasses at least a part of each entity of the one or more entities of the set.

The environment may correspond to the environment around the person, i.e. the environment in which the person is present. Additionally or alternatively, the environment may correspond to a further environment, in which the person is not present, for example, to the environment around an entity that is controlled from a distance by the person respectively teleoperated by the person. The terms "teleoperate", "remotely control" and "control from a distance" may be used as synonyms.

The shape of an entity is to be understood as corresponding to the form and size of the entity. That is, the shape of an entity depends on the form and size of the entity. The estimated location of a respective entity is to be understood as the estimated location in the environment.

The person that is assisted by the method may also be referred to as user.

The coordinates and extents of each entity of the set may be obtained by an optical tracking system. One or more sensors of a sensor unit may be used for obtaining the coordinates and extents of each entity of the set. The one or more sensors may correspond to one or more radar devices, one or more cameras, one or more lidar devices and/or one or more laser scanners. In addition or alternatively, one or more inertial measurement units (e.g. inertial sensor modules) and/or odometry may be used for obtaining the coordinates and extents of each entity of the set, in particular for performing location estimation. Obtaining the coordinates and extents of an entity, such as a person, a physical object or a virtual object in an environment, are known in the field of environmental/spatial awareness support systems and, thus, no further information is provided with regard thereto. For virtual environments the location and shape information and, thus, the coordinates and extents of an entity (e.g. a virtual object) in a virtual environment may be already known and, therefore, may be directly available. The terms "environmental" and "spatial" may be used as synonyms.

Coordinates of entities may for instance be acquired using optical marker tracking, such as ARUCO or VuForia. Object extents may for instance be acquired by RGBD-cameras (e.g. Kinect) and transformed into a shape using corresponding algorithms, like Kinect Fusion etc.

A basic optical tracking system may consist of an algorithm for detecting arrangements of luminance contrasts that correspond to unique visual markers attached to the objects of interest or visual features (e.g. edges) of the objects of interest. The objects of interest are the one or more entities of the selected set. Assuming calibrated camera positions, the locations of these detected features can then be translated from camera sensor coordinates to environment coordinates.

The same applies for estimating a location and shape of each entity on the basis of the obtained coordinates and extents of the respective entity. That is, estimating a location and shape of each entity on the basis of the obtained coordinates and extents of the respective entity are known in the field of environmental/spatial awareness support systems and, thus, no detailed information is provided with regard thereto. In particular, the location and shape of a respective entity may be estimated based on the obtained coordinates and extents of the respective entity using one or more algorithms. Alternatively or additionally, the location and shape of a respective entity may be estimated based on the obtained coordinates and extents of the respective entity using data, e.g. stored in one or more lookup tables, that provide an association between the obtained coordinates and obtained extents of a respective entity and the location and shape of the respective entity. The data may be provided e.g. in real time or may be stored data.

The shape information may be extracted from coordinates and extents using classifiers or shape matching algorithms (e.g. Shape matching: Veltkamp, Remco C. "Shape matching: Similarity measures and algorithms." Proceedings International Conference on Shape Modeling and Applications. IEEE, 2001). The location may be obtained by projecting the sensor-coordinates into the task-relevant coordinate frame, for instance one that is relative to the user, a relevant object, a room or another entity.

For the shape estimation of an entity (such as a person or a physical object) from a set of tracked points of the entity various solutions exists. According to an embodiment, a convex hull, i.e. the smallest convex set that contains the set of given points, for which a variety of algorithms are available may be determined. According to a further embodiment, this may be extended to concave hulls. The selection of points of the entity that should be considered for determining the shape of the entity may take place by filtering for common motion (application of the gestalt law of common fate). Common motion is thereby defined as maintaining a stable spatial arrangement (relative locations) within specified error margins and elasticity constraints during motion relative to the environment.

The determination of the area of interest may be performed by using one or more algorithms. Additionally or alternatively, the determination may be performed by using data, e.g. stored in one or more lookup tables that provide an association between the estimated locations and shapes of the one or more entities of the set and an area of interest. The data may be provided in real time or may be stored data.

The area of interest may be determined using similar methods as for individual shape estimations such as computing a convex hull that encompasses all entities of interest that should be treated as a common unit. The entities of interest correspond to the one or more entities of the selected set.

The area of interest may correspond to a feedback area, within which the person to be assisted receives a feedback with regard to the environment. The term "feedback zone" may be used as a synonym for the term "feedback area". The at least one part of each entity of the set, which is encompassed by the area of interest, is used for evaluating a deviation from a target state in order to provide feedback to the person with respect to the environment.

According to an embodiment, the shape of the area of interest may correspond to a shape of the combination of the one or more entities of the set. The area of interest may be greater than or equal to the area formed by the shapes of the one or more entities of the set. For example, the selected set may comprise three entities, which correspond to the person being assisted by the method, a physical object associated with the person (e.g. a box being carried) and a further person associated with the person (e.g. a further person helping the person carrying the box). In this case, the area of interest encompassing these three entities may comprise a shape of the combination of the person, the object associated with the person and the further person associated with the person. In particular, the area of interest may be greater than or equal to the area formed by the shapes of the person, the object associated with the person and the further person associated with the person.

According to another embodiment, the shape of the area of interest may correspond to a shape of the combination of at least parts of the one or more entities of the set. The area of interest may be smaller than the area formed by the shapes of the one or more entities of the set. For example, the selected set may comprise three entities, which correspond to the person being assisted by the method, a first physical object associated with the person (e.g. a box being carried) and a second physical object associated with the person (e.g. a robot with a carrying element helping the person to carry the first physical object). In this case, the area of interest may encompass a part of the person, namely the arms of the person carrying the box, the entire first physical object and a part of the second physical object, namely the carrying element of the robot. Thus, the shape of the area of interest may correspond to the shape of the combination of the part of the person, the first physical entity and the part of the second physical entity. That is, the shape of the area of interest may correspond to a shape of the combination of the arms of the person, the box carried by the person, and the carrying element of the robot helping the person carrying the box. In particular, the area of interest may be smaller than the area formed by the shapes of the person, the object associated with the person (e.g. the box) and the further object associated with the person (e.g. the robot). Namely, the area of interest may correspond to the area formed by the shapes of the arms of the person, the carried box and the carrying element of the robot.

Optionally, the area of interest encompasses each entity of the set. Alternatively, the area of interest may encompass at least one or more of the one or more entities of the set.

The area of interest may correspond to a continuous area. For example, in case the selected set comprises two entities, which correspond to the person being assisted by the method and a physical object associated with the person (e.g. a box being carried), the area of interest may be a continuous area encompassing the person and the box, because the box being carried by the person is in contact with the person. Alternatively, the area of interest may comprise two or more sub-areas, which do not form a continuous area. A sub-area of the area of interest may also be referred to by the term "sub-area of interest". With other words, the two or more sub-areas are not in contact with each other, but they are spatially apart from each other. That is, the two or more sub-areas of the area of interest are disjoint. Thus, the two or more sub-areas of the area of interest form an interrupted/discontinuous area. For example, in case the selected set comprises two or more entities, which correspond to moving physical objects that are spatially apart from each other, such as a group of flying drones, the area of interest may comprise the two or more entities, wherein the area of interest may be formed by two or more sub-areas each encompassing one entity of the two or more entities.

In particular, irrelevant space (respectively open space) between the two or more entities of the selected set may be excluded from the area of interest encompassing the two or more entities, leading to a spatial partitioning of the area of interest formed by the two or more sub-areas each encompassing one entity of the two or more entities. In this case, the two or more sub-areas form a discontinuous area of interest and the two or more sub-areas are disjoint. The area of interest may be flexible and may change dynamically. Thus, there may be instances where the two or more sub-areas encompassing the two or more entities form a continuous area of interest (e.g. there is no irrelevant space between the two or more entities of the selected set) and instances where the two or more sub-areas encompassing the two or more entities form a discontinuous area of interest.

For example, in the case of three flying drones, the area of interest encompassing the three flying drones may comprise three sub-areas, wherein each sub-area encompasses a different drone of the three flying drones. When the three different drones fly in different directions, irrelevant space (respectively open space) between the three drones may be excluded from the area of interest encompassing the three drones, leading to a spatial partitioning of the area of interest. As a result, the three sub-areas forming the area of interest encompassing the three drones may not form a continuous area. That is, the three sub-areas may be disjoint. The area of interest may be flexible and may change dynamically and, thus, there may be instances where the three sub-areas encompassing the three drones form a continuous area of interest and instances where the three sub-areas encompassing the three drones form a discontinuous area of interest.

This may also be the case, for example, when the selected set comprises two entities, which correspond to the person being assisted by the method and a moving physical object, such as a flying drone, being controlled by the person. Namely, as a result of the physical object moving (e.g. the drone flying), at a time the moving physical object and the person may be not nearby respectively in contact. As a result, an area of interest encompassing the person and the moving physical object may comprise two sub-areas that do not form a continuous area, but that are spatially apart respectively disconnected from each other. One of the two sub-areas may comprise the person or a part of the person and the other sub-area of the two sub-areas may comprise the moving physical object or a part of the physical object.

In case an area of interest comprises two or more sub-areas, which are disjoint and, thus, do not form a continuous area, and the area of interest encompasses a plurality of entities of a selected set, then each sub-area of the area of interest may comprises one or more entities of the selected set, wherein the sub-areas comprise different one or more entities. For example, the area of interest encompassing a plurality of entities of a selected set may be formed by two disjoint sub-areas (that do not form a continuous area), wherein a first sub-area of the two sub-areas may comprise one or more entities of the plurality of entities and the second sub-area of the two sub-areas may comprise the remaining entities of the plurality of entities.

Therefore, the area of interest may be a continuous area or it may be disjoint and flexible comprising two or more sub-areas depending on the selected set of entities, wherein the sub-areas may be spatially apart from each other.

The characteristics, such as the magnitude (amplitude), frequency and/or pattern, of the coherent stimuli may be dependent on the deviation from the target state. That is, the greater the deviation from the target state, the greater the magnitude and/or frequency of the coherent stimuli may be.

The place of the person's body, to which the coherent stimuli are applied to for communicating the deviation from the target state, may depend on the location in the environment and direction with respect to the person of occurrence of the deviation between the current state of the area of interest and the target state. That is, in case a deviation from the target state occurs in front of the person, the coherent stimuli may be applied to the person's body such that the stimuli relate to the front side of the person's body. For example, the coherent stimuli, e.g. tactile and/or visual stimuli, may be applied to the front side of the person's body, in case a deviation from the target state occurs in front of the person. In case a deviation from the target state occurs behind the person, the coherent stimuli may be applied to the person's body such that the stimuli relate to the backside of the person's body. For example, in case of applying tactile stimuli for communicating a deviation from the target state occurring behind the person, the tactile stimuli may be applied to the backside of the person's body (stimulating the person's sensory system for touch). In case of applying visual stimuli for communicating a deviation from the target state occurring behind the person, the visual stimuli may applied to the person's body (stimulating the person's sensory system for vision) such that the deviation is shown near a visual representation of the person's back. In case a deviation from the target state occurs on one side of the person, the coherent stimuli may be applied to the one side of the person's body etc.

The step of evaluating the area of interest with respect to one or more variables of interest and the step of communicating the deviation from the target state to the person may optionally be periodically repeated. Alternatively or additionally, they may be performed as a result of a command by the person being assisted by the method.

Additionally or alternatively, all the steps of the method according to the first aspect except for the step of selecting the set may optionally be repeated. According to an embodiment, they may be periodically repeated. Alternatively or additionally, they may be repeated in case the configuration of the one or more entities of the set is changed or varied. That is, a dynamic reconfiguration may be performed. For example, in case the set comprises two entities that correspond to the person and an object associated with the person, such as e.g. a box being carried, then the way the person carries the box may be changed for example from carrying the box longitudinal to carrying the box diagonally. As a result, the area of interest is determined again on the basis of the estimated location and shape of the box, wherein the orientation of the box with respect to the person has changed. Alternatively or additionally, the aforementioned steps may be performed as a result of a command by the person being assisted by the method.

Additionally or alternatively, the steps of determining an area of interest, evaluating the area of interest and communicating the deviation from the target state may optionally be repeated. According to an embodiment, they may be periodically repeated. Alternatively or additionally, they may be repeated as a result of a command by the person being assisted by the method. For example, the set may comprise one entity, which is the person to be assisted and the area of interest may be determined on the basis of the estimated location and shape of the person and an additional safety area to be added to the boundaries of the area of interest. In this case, the additional safety area may be dependent on a probability of a risk, such as an infection risk with a disease, for the person. Therefore, the size of the additional safety area and, thus, the size of the area of interest may vary according to the probability of a risk, such as an infection risk with a disease, for the person. That is, in each iteration of the aforementioned repetition of steps, the area of interest may be determined based on the estimated location and shape of the person and the additional safety area, which depends on the probability of a risk for the person.

The term "border" may be used as a synonym for the term "boundary".

Additionally or alternatively, all the steps of the method according to the first aspect may be optionally repeated. According to an embodiment, the steps of the method may be periodically repeated. Alternatively or additionally, they may be performed in response to a command by the person being assisted by the method. For example, in case the set initially comprises two entities, namely the person and a physical object associated with the person, such as a box being carried by the person, a further person may help the person by starting to also carry the box. In this case, the person may trigger a repetition of all steps of the method, wherein the person, the box and the further person helping the person in carrying the box are now selected as a new set of three entities.

According to an embodiment, the selection of the set corresponds to selecting a set of two or more entities present in the environment. In particular, the selection of the set may correspond to selecting a set of two or more entities present in the environment, wherein one entity of the two or more entities corresponds to the person (that is assisted by the method).

According to an implementation form of the first aspect, the method comprises the step of determining the area of interest on the basis of the estimated location and shape of each entity of the set and additional information.

According to an implementation form of the first aspect, the additional information defines an additional safety area to be added to boundaries of the area of interest. Alternatively or additionally, the additional information defines one or more parts of one or more entities of the set to be excluded for determining the area of interest. Additionally or alternatively, the additional information defines external factors of the environment, such as airflow, presence or level of physical protection of the set and/or location history of the set.

In particular, the additional safety area is to be added to boundaries of the area of interest, which is determined based on the estimated location and shape of each entity of the set.

For example, the set may comprise two entities, wherein one entity is the person and the other entity is an object associated with the person, such as a tool for repairing a machine. In this case, only the arm and hand handling the tool may be relevant for assisting the person in not damaging the machine by the tool while repairing the machine. Therefore, in this case, the additional information may define all of the person's body except of the arm and hand handling the tool to be excluded for determining the area of interest. As a result, the area of interest may be determined based on only the estimated location and shape of the arm and hand of the person as well as the tool. Thus, the area of interest encompasses only the arm and hand of the person and the tool. The shape of the area of interest may correspond to the shape of the combination of the arm and hand of the person and the tool.

That is, optionally parts of the person and parts of one or more objects associated with the person (in case the entities of the set correspond to the person and one or more objects associated with the person) may be excluded from the area of interest. Such cases enable awareness of smaller awareness regions, where not the whole body of the person or the whole body of each of the one or more objects is relevant, and which require a precise perception of the space/area around an entity, such as an object associated to the person. Examples comprise: perceiving the space/area around a small pipe for later deployment; feeling the boundaries in small, labyrinthine paths (e.g. hot wire game); architectural sketching taking distances to structural and legal distances into account; engineering drawings taking safety margins to mechanical and electrical compounds into account; etc.

According to an implementation form of the first aspect, the additional safety area is dependent on a probability estimation of a risk, such as an infection risk with a disease, for the person.

According to an implementation form of the first aspect, the one or more entities of the set are the person, one or more objects associated with the person, and/or one or more further persons associated with the person.

For example, the one or more entities of the set may be the person (e.g. person, wherein the area of interest is enlarged beyond the shape of the person by an additional safety area for social distancing to reduce the risk of infection by a disease from another person), one or more physical objects teleoperated by the person, the person and one or more physical objects associated with the person (e.g. person carrying a box, person pushing a shopping cart, person pulling a physical object etc.), the person, one or more physical objects associated with the person and one or more further persons associated with the person (e.g. person carrying box together with a further person), the person with one or more further persons associated with the person (e.g. mother walking with child; the person and one or more further independently operating persons whose task is connected to the person, supervising one or multiple mobile persons, synchronizing the person's location and/or movement relative to one or more further persons), the person and one or more virtual objects (e.g. person driving a virtual vehicle), or the person and one or more teleoperated physical objects (e.g. person and robot teleoperated by the person; person, robot teleoperated by the person and physical object carried by the robot).

In case one entity of the set comprising two or more entities corresponds to the person to be assisted, the one or more further entities of the set expand the physical space that is occupied by the person in the environment. The expanded physical space occupied by the person in the environment may be represented by the area of interest AOI.

According to an implementation form of the first aspect, the environment comprises a first environment around the person, a second environment around the one or more objects associated with the person, and/or a third environment around the one or more further persons associated with the person.

The first environment, second environment and/or third environment may correspond to each other.

For example, the selected set may comprise two entities, wherein one entity is the person being assisted and the other entity is an object associated with the person, such as a shopping cart being pushed by the person. In this case, the environment (being assessed), the first environment around the person and the second environment around the object associated with the person correspond to each other. The same applies in case the set comprises an additional third entity being a further person associated with the person, such as a further person helping the person pushing the shopping cart by pulling the shopping cart. In such a case the environment (being assessed), the first environment around the person, the second environment around the object associated with the person and the third environment around the further person associated with the person correspond to each other.

In case the selected set comprises two entities, wherein one entity is the person being assisted and the other entity is an object associated with the person, such as a robot being teleoperated by the person, the environment (being assessed) comprises the first environment around the person and the second environment around the object associated with the person. In this case, the first environment and the second environment do not correspond to each other. This is a case, in which the area of interest encompassing the two entities of the selected set, i.e. the person and the teleoperated robot, is not a continuous area. Namely, in this case the area of interest may comprise two sub-areas, wherein a first sub-area of the two sub-areas may encompass the person present in the first environment and the second-sub area of the two sub-area encompasses the robot present in the second environment. Since the first environment and the second environment do not correspond to each other, the two sub-areas of the area of interest are spatially apart and, thus, do not form a continuous area. That is, as outlined already above, the area of interest (e.g. encompassing the person and the teleoperated robot) may be disjoint and flexible comprising two or more sub-areas depending on the selected set of entities, wherein the sub-areas are spatially apart from each other. As outlined above, the two or more sub-areas may be directed to different environments.

Thus, the method according to an implementation form of the first aspect may give feedback to the person (being assisted) on the deviation of the person's current state from a target state and the deviation of the current state of one or more objects being teleoperated by the person from the target state. For example, the current state corresponds to a distance to an obstacle and the target state corresponds to a minimum distance to an obstacle. In this case, the method may be used to prevent collisions of the person with obstacles of the first environment around the person as well as collisions of the one or more teleoperated objects with obstacles of the second environment around the one or more teleoperated objects. That is, at the same time unwanted collisions of the person with obstacles in the corresponding first environment and unwanted collisions of the one or more teleoperated objects with obstacles in the corresponding second environment may be prevented.

According to an implementation form of the first aspect, the one or more entities of the set are one or more physical entities and/or one or more virtual entities.

For example, the set of entities may comprise two entities, wherein one entity is the person (being assisted) and the second entity is a virtual object associated with the person, which may or may not resemble the shape and, thus, the form and size of a physical object. For example, the virtual object may correspond to a real vehicle. Thus, the method allows planning paths for large vehicles without maneuvering and potentially damaging them. The method may also be used for planning the installations of pathways such as pipes, street and carpets. This is also advantageous with respect to training scenarios, where the use of virtual objects has advantages over using real objects (i.e. physical objects), for example, in case these are very expensive or fragile. The terms "real objects" and "physical objects" may be used as synonyms.

In particular, the set of entities may comprise three entities. For example one entity is the person, a second entity is a virtual object resembling a real object, such as a vehicle, and the third entity is a physical object, such as a smaller model of the vehicle that is moved by the person e.g. for planning the paths for the vehicle.

According to an implementation form of the first aspect, the one or more variables of interest comprise a distance between boundaries of the area of interest and an obstacle, such as a further entity, in the environment, a deviation of the area of interest from a tracking area of a position tracking system, and/or a deviation of the area of interest from an area of one or more characteristics, such as available wireless data.

The current state may correspond to the distance between the boundaries of the area of interest and an obstacle, such as a further entity, in the environment. The target state may correspond to an allowable minimum distance between the boundaries of the area of interest and the obstacle in the environment. In other words, the target state may correspond to a state in which the distance between the boundaries of the area of interest and the obstacle is equal to or greater than the minimum distance, i.e. a threshold value.

Additionally or alternatively, the target state may correspond to a state of the area of interest in which the area of interest is within a range of the tracking area of the position tracking system. The tracking area may also be referred to as working area. Additionally or alternatively, the target state may correspond to a state of the area of interest in which the area of interest is within the area of one or more characteristics, such as available wireless data.

According to an implementation form of the first aspect, selection of the set is performed manually by the person. Additionally or alternatively, selection of the set is performed automatically.

In particular, a processing unit performing the method according to the first aspect or any of its implementation forms may automatically perform the selection of the set.

According to an implementation form of the first aspect, the coherent stimuli comprise at least one of the following stimuli: visual stimuli, tactile stimuli, auditory stimuli, electromagnetic stimuli, chemical stimuli, and/or heat stimuli.

According to an embodiment, the coherent stimuli are coherent tactile and visual stimuli.

In order to achieve the method according to the first aspect, some or all of the above described implementation forms and optional features may be combined with each other.

A second aspect of the present disclosure provides a system for assisting a person in assessing an environment, wherein the system comprises a processing unit and a sensor unit. The processing unit is configured to select a set of one or more entities present in the environment. The sensor unit comprises one or more sensors. The sensor unit is configured to obtain coordinates in the environment and extents of each entity of the set. The processing unit is configured to estimate a location and shape of each entity of the set on the basis of the obtained coordinates and extends of the respective entity. Further, the processing unit is configured to determine an area of interest on the basis of the estimated location and shape of each entity of the set, wherein the area of interest encompasses at least a part of each entity of the set. Furthermore, the processing unit is configured to evaluate the area of interest with respect to one or more variables of interest in order to evaluate a deviation between a current state of the area of interest from a target state. The system further comprises a communication unit configured to communicate the deviation from the target state to the person using coherent stimuli for stimulating the person's body.

The system according to the second aspect is configured to perform the method according to the first aspect or any of its implementation forms.

According to an implementation form of the second aspect, the communication unit comprises one or more actuator elements of at least one of the following types: vibro-tactile actuator, pressure-applying actuator, light emitter, loud speaker, electrode, induction coil, chemical emitter/agent, and heating element.

In particular, the communication unit comprises a plurality of actuator elements. The plurality of actuator elements may correspond to one or more vibro-tactile actuators, one or more pressure-applying actuators, one or more light emitters, one or more loud speakers, one or more electrodes, one or more induction coils, one or more chemical emitters/agents and/or one or more heating elements.

A vibro-tactile actuator is configured to provide tactile stimuli to the person's body by generating vibration and applying the vibration to the person's body. A pressure-applying actuator is configured to provide tactile stimuli to the person's body by generating pressure and applying the pressure to the person's body. A light emitter is configured to provide visual stimuli to the person's body, in particular to the eyes, by generating visible light and providing the visible light to the person's body, in particular the eyes. A loud speaker is configured to provide auditory stimuli to the person's body, in particular the ears, by generating sound and providing the sound to the person's body, in particular to the ears. An electrode and/or an induction coil are each configured to provide the electromagnetic stimuli to the person's body by generating electromagnetic waves that are perceivable by the person and applying these electromagnetic waves to the person's body. A chemical emitter/agent is configured to provide chemical stimuli to the person's body by causing chemical processes that are perceivable by the person's body and providing these chemical processes to the person's body. A heating element is configured to provide heat stimuli to the person's body by generating heat and applying the heat to the person's body.

According to an implementation form of the second aspect, the coherent stimuli are coherent tactile and visual stimuli; and the communication unit comprises a display unit for outputting the visual stimuli of the coherent tactile and visual stimuli, and a tactile actuator unit for outputting the tactile stimuli of the coherent tactile and visual stimuli. The display unit and/or the tactile actuator unit may be wearable by the person. Optionally, the display unit may be configured for a visual representation showing a third person perspective. Especially, this may be the case, when the person to which the visual stimuli are to be output is an observer. Alternatively or additionally, the display unit may be configured for a visual representation showing a first person perspective (respectively ego perspective). The display unit may be configured for a visual representation showing the environment in which the person is present and/or at least one further environment (in which the person is not present). Such a further environment may be for example an environment of a physical object, such as a robot, that is remotely operated by the person. That is, the display unit may be configured for a visual representation for mixed-reality or telepresence operations (e.g. teleoperating a robot). The display unit may comprise or correspond to a mixed-reality display unit, such as mixed-reality smart glasses.

The tactile actuator unit may comprise or correspond to a belt and/or a band wearable by the person around its body, e.g. a belt wearable at the waist and/or a headband wearable at the head, wherein the belt or the band comprises a plurality of vibro-tactile actuators and/or pressure-applying actuators along the belt respectively the band.

The tactile actuator unit may be configured to remotely provide tactile stimuli to a person's sensory system, in particular to the sensory system for touch. For example, the tactile actuator unit may be configured to output one or more air blasts respectively wind as tactile stimuli. Optionally, the tactile actuator unit may be configured to remotely provide tactile stimuli to a person's sensory system using ultrasound. For example, the tactile actuator unit may be configured for mid-air haptics, such as mid-air ultrasound haptics. The tactile actuator unit may comprise or correspond to one or more drones, such as quadcopters, that are configured to output tactile stimuli. Such one or more drones may be referred to as "tactile drones".

According to an implementation form of the second aspect, the sensor unit is an optical tracking system. The one or more sensors of the sensor unit may correspond to one or more radar devices, one or more cameras, one or more lidar devices, one or more laser scanners, and/or one or more inertial measurement units (e.g. one or more inertial sensor modules).

The above description with regard to the method according to the first aspect and its implementation forms is correspondingly valid for the system according to the second aspect and its implementation forms.

The system according to the second aspect and its implementation forms and optional features achieve the same advantages as the method according to the first aspect and its respective implementation forms and respective optional features.

In order to achieve the system according to the second aspect, some or all of the above-described implementation forms and optional features may be combined with each other.

In the following, embodiments of the disclosure is described exemplarily with reference to the enclosed figures, in which FIG. 1 shows a simplified flowchart illustrating the main steps of an exemplary embodiment of the inventive disclosure. Thus, FIG. 1 shows all the steps of the method according to the first aspect. In detail:

In a first step S1 of the method for assisting a person in assessing an environment, a set of one or more entities present in the environment are selected. As outlined already above, with respect to the method of the first aspect, the one or more entities may correspond to the person itself, one or more objects associated with the person and/or one or more further persons associated with the person. Examples thereof are exemplarily described below with respect to FIGS. 3A, 3B, 4A, 4B, 4C, 5A, 5B, 6, 7 and 8.

In a next step S2 following the first step S1, the coordinates in the environment and extents of each entity of the set generated in step S1 are obtained. The coordinates in the environment and extents of each entity may be obtained by using a sensor unit comprising one or more sensors. In particular, the sensor unit may be an optical tracking system. As outlined already above, obtaining coordinates in an environment and extents of an entity present in the environment is known in the field of environmental/spatial awareness support systems and, thus, no further information is provided with regard thereto.

In a next step S3 following the step S2, a location in the environment and shape of each entity of the set are estimated based on the coordinates and extends of the respective entity obtained in step S2. In particular, the location and shape of a respective entity may be estimated based on the obtained coordinates and extents of the respective entity using one or more algorithms. Alternatively or additionally, the location and shape of a respective entity may be estimated based on the obtained coordinates and extents of the respective entity using data, e.g. stored in one or more lookup tables that provide an association between the obtained coordinates and obtained extents of a respective entity and the location and shape of the respective entity. The data may be provided in real time or may be stored data. As outlined already above, estimating a location in an environment and shape of an entity present in the environment on the basis of the coordinates in the environment and extents of the entity is known in the field of environmental/spatial awareness support systems and, thus, no further information is provided with regard thereto.

In a next step S4 following the step S3, an area of interest is determined based on the location and shape of each entity estimated in step S3, wherein the area of interest encompasses at least a part of each entity of the set. The determination may be performed by using one or more algorithms. Additionally or alternatively, the determination may be performed by using data, e.g. stored in one or more lookup tables that provide an association between the one or more entities of the set and an area of interest. The data may be provided in real time or may be stored data.

Optionally, the area of interest may be determined such that the area of interest encompasses each entity of the set. Alternatively, the area of interest may be determined such that the area of interest encompasses a part of each entity of the set. Alternatively, in case the set comprises two or more entities, the area of interest may be determined such that the area of interest comprises only a part of one or more entities of the set and/or the whole of the other one or more entities of the set.

Optionally, in step S4, the area of interest may be determined based on the location and shape of each entity estimated in step S3 and additional information. The additional information may define an additional safety area to be added to the boundaries of the area of interest. The additional safety area may be dependent on a probability estimation of a risk, such as an infection risk with a disease, for the person. Additionally or alternatively, the additional information may define one or more parts of one or more entities of the set to be excluded from determining the area of interest. Additionally or alternatively, the additional information may define external factors of the environment, such as airflow, presence or level of physical protection of the set and/or location history of the set.

In a next step S5 following step S4, a deviation between a current state of the area of interest from a target state may be evaluated by evaluating the area of interest with respect to one or more variables of interest. The one or more variables of interest may comprise a distance between boundaries of the area of interest and an obstacle, such as a further entity, in the environment, a deviation of the area of interest from a tracking area of a position tracking system, and/or a deviation of the area of interest from an area of one or more characteristics, such as available wireless data.

In a next step S6 following step S5, the deviation between the current state and the target state evaluated in step S5 is communicated to the person using coherent stimuli for stimulating the person's body and, thus, providing feedback to the person with respect to the environment. By stimulating the person's body using coherent stimuli one or more of the different sensory systems of the person may be stimulated. Which sensory system of the different sensory systems of the person is stimulated depends on the type of stimuli applied to the person's body and, thus, stimulating the sensory systems. For example, in case of applying visual and tactile stimuli to the person's body, the sensory system for vision and the sensory system for touch of the person are stimulated respectively effected by those stimuli. As outlined already above, the coherent stimuli may comprise at least one of the following stimuli: visual stimuli, tactile stimuli, auditory stimuli, electromagnetic stimuli, chemical stimuli, and/or heat stimuli. For further information with respect to step S6 reference is made to the respective description of the method according to the first aspect or any of its implementation forms.

For further information with respect to steps S1 to S6 reference is made to the respective description of the method according to the first aspect or any of its implementation forms.

As indicated in FIG. 1 by the arrow starting at the box of step S6 and ending at the box of step S5, step S5 of evaluating and step S6 of communicating may optionally be repeated. According to an embodiment, the steps S5 and S6 may optionally be periodically repeated. Alternatively or additionally, the steps S5 and S6 may be repeated as a result of a command by the person being assisted by the method.

Additionally or alternatively, as indicated in FIG. 1 by the arrow starting at the box of step S6 and ending at the box of step S2, the steps S2, S3, S4, S5 and S6 may optionally be repeated. According to an embodiment, the steps S2 to S6 may be periodically repeated. Alternatively or additionally, the steps S2 to S6 may be repeated in case the configuration of the one or more entities of the set is changed or varied. Alternatively or additionally, the steps S2 to S6 may be repeated as a result of a command by the person being assisted by the method.

Additionally or alternatively, as indicated in FIG. 1 by the arrow starting at the box of step S6 and ending at the box of step S4, the steps S4, S5 and S6 may optionally be repeated. According to an embodiment, the steps S4 to S6 may be periodically repeated. Alternatively or additionally, the steps S4 to S6 may be repeated as a result of a command by the person being assisted by the method.

Additionally or alternatively, as indicated in FIG. 1 by the arrow starting at the box of step S6 and ending at the box of step S1, all the steps, i.e. the steps S1, S2, S3, S4, S5 and S6, may optionally be repeated. According to an embodiment, the steps S1 to S6 may be periodically repeated. Alternatively or additionally, the steps S1 to S6 may be repeated as a result of a command by the person being assisted by the method.

Figure 2:
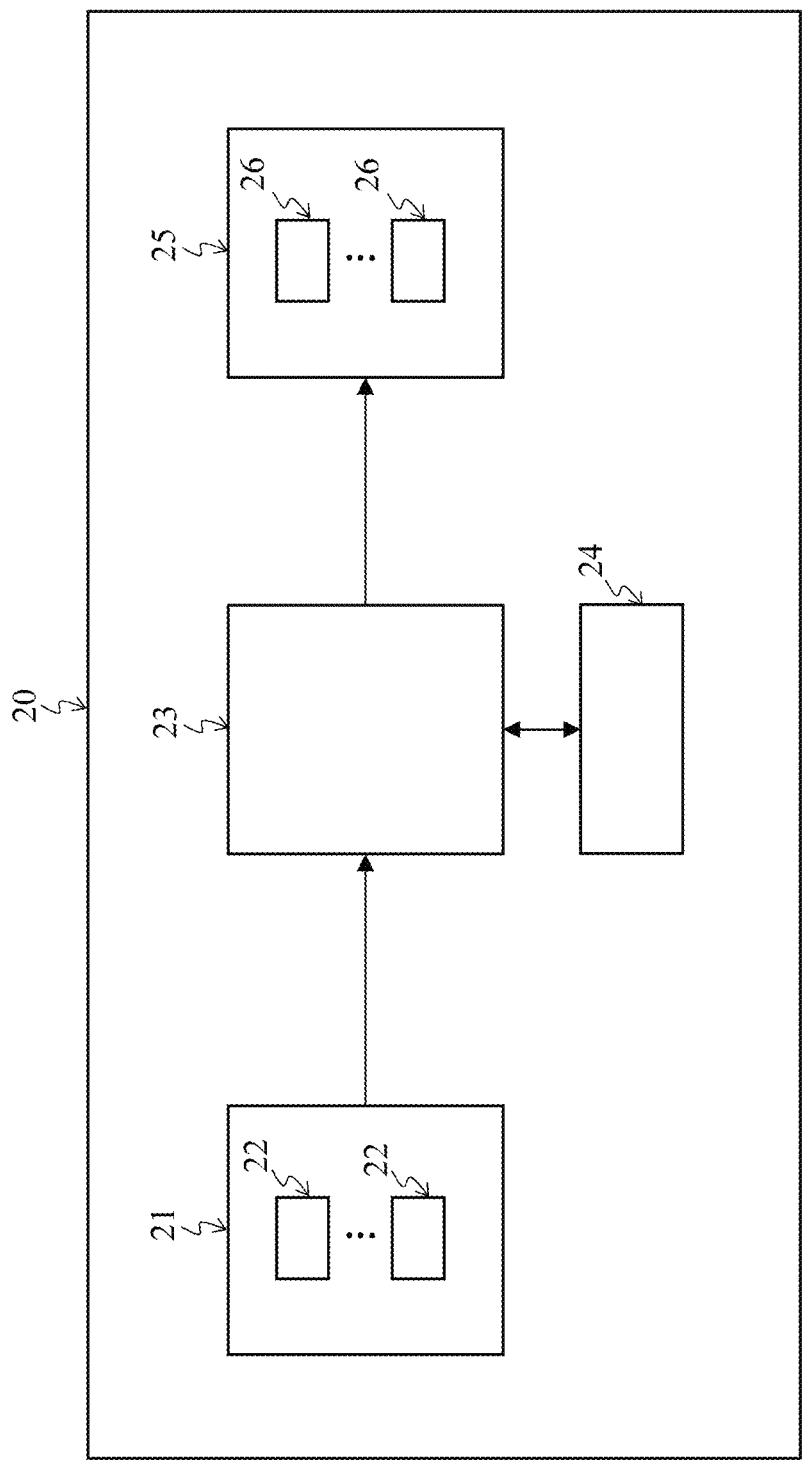
FIG. 2 shows a block diagram illustrating the components of a system according to an embodiment of the present disclosure.

FIG. 2 shows a block diagram illustrating the components of a system according to an embodiment of the present disclosure.

The system 20 of FIG. 2 comprises a sensor unit 21 with one or more sensors 22, a processing unit 23, an optional storage unit 24 and a communication unit 25 with one or more actuator elements 26. In FIG. 2 two sensors 22 and two actuator elements 26 are shown. This is only by way of example and does not limit the present disclosure.

The sensor unit 21 may be an optical tracking system. The one or more sensors 22 may correspond to one or more radar devices, one or more cameras, one or more lidar devices, one or more laser scanners and/or one or more inertial measurement units (e.g. one or more inertial sensor modules). The processing unit 23 may be a controller, microcontroller, processor, microprocessor, a field programmable gate array (FPGA), an application specific integrated circuit (ASIC) or any combination of these elements. The optional storage unit 24 is configured to store data usable by the processing unit 23. The term "memory" may be used as a synonym for the term "storage unit". The processing unit 23 may be configured to read and write data to the optional storage unit 24. The optional storage unit 24 may be part of the processing unit 23. The one or more actuator elements 26 of the communication unit 25 may be of at least one of the following types: vibro-tactile actuator, pressure-applying actuator, light emitter, loud speaker, electrode, induction coil, chemical emitter/agent, and heating element. The processing unit 23 may be configured to control the sensor unit 21 and the communication unit 25.

The processor unit 23 is configured to perform the steps S1, S3, S4 and S5 of the method according to FIG. 1. That is, the processor unit 23 is configured to perform the steps of selecting a set, estimating a location and shape, determining an area of interest and evaluating the area of interest of the method according to the first aspect or any of its implementation forms, as described above.

The sensor unit 21 is configured to perform step S2 of the method according to FIG. 1. That is, the sensor unit 21 is configured to perform the step of obtaining coordinates and extents of each entity of the method according to the first aspect or any of its implementation forms, as described above. The communication unit 25 is configured to perform the step S6 of the method according to FIG. 1. That is, the communication unit 25 is configured to perform the step of communicating the deviation from the target state of the method according to the first aspect or any of its implementation forms, as described above.

In the following, examples of different scenarios of using the method according to the first aspect or any of its implementation forms are described with respect to FIGS. 3A, 3B, 4A, 4B, 4C, 5A, 5B, 6, 7 and 8. Therefore, the description of the method according to the first aspect or any of its implementation forms as well as the description of the method of FIG. 1 are correspondingly valid for the embodiments of FIGS. 3A, 3B, 4A, 4B, 4C, 5A, 5B, 6, 7 and 8 and, thus, reference is made thereto in the following.

Figure 3B:
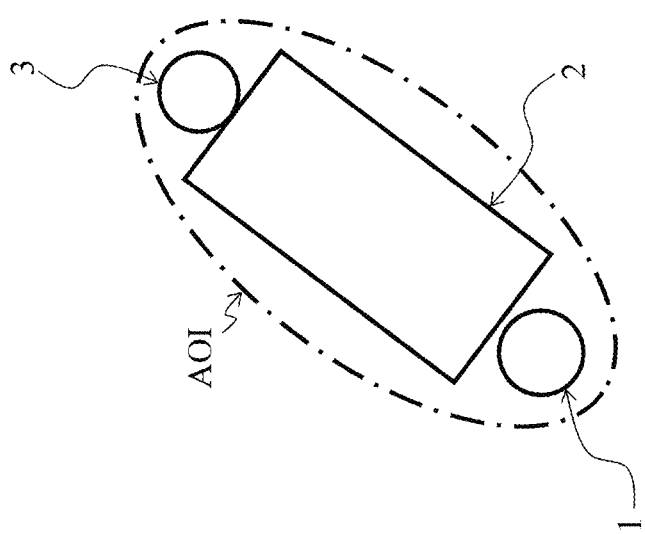
FIGS. 3A and 3B schematically show an area of interest determined by a method according to an embodiment of the present disclosure.
Figure 3A:
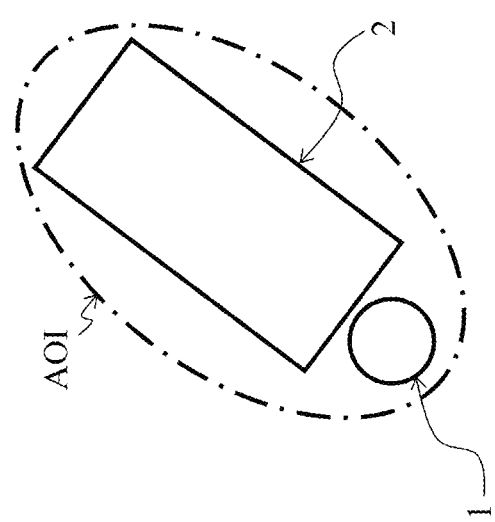

FIGS. 3A and 3B schematically show an area of interest determined by a method according to an embodiment of the present disclosure.

According to the embodiment of FIG. 3A, the selected set comprises two entities 1 and 2 in an environment. A first entity of the two entities corresponds to the person 1 that is to be assisted, which is schematically shown from a Birdseye's view as a circle. The second entity corresponds to a physical object 2 associated with the person 1, which is schematically shown from a Birdseye's view as a rectangle. For example, the physical object 2 may be a box being carried or pushed by the person 1, a shopping cart being pushed by the person 1, a baby bugger being pushed by the person 1, a patient bed of a hospital or nursing home being pushed by the person 1, an lawn mower being used by the person 1 etc.

As shown in FIG. 3A the area of interest AOI encompasses the person 1 and the physical object 2. That is, the area of interest AOI encompasses each entity of the set. The area of interest AOI is greater than the area formed by the shapes of the person 1 and the physical object 2. The shape of the area of interest AOI of FIG. 3A is only by way of example and is not limiting the present disclosure. That is, instead of the form of the area of interest AOI being elliptic, as shown in FIG. 3A, the form of the area of interest may be different, such as circular, rectangular etc. In addition or alternatively, the size of the area of interest AOI may be different, as long as the area of interest AOI encompasses each entity of the set. The physical object 2 expands the physical space that is occupied by the person 1 in the environment, wherein said expanded physical space is represented by the area of interest AOI.

As can be depicted from FIG. 3A, the feedback area within which the person receives a feedback with regard to the environment by the method is enlarged by the area of interest compared to a feedback area that corresponds to only the shape of the person 1 or the object 2. As a result, the awareness of the person 1 is improved, because a deviation from a target state, such as a minimum distance to an obstacle in the environment, is not only evaluated by comparing the current state of the person, such as a distance to an obstacle. In contrast, a deviation from a target state is evaluated by comparing the current state of the area of interest AOI to the target state. As a result, when the person moves, he also receives feedback in case the physical object comprised by the area of interest AOI would approach too near to an obstacle in the environment. That is, in case the distance between the boundaries of the area of interest AOI and the respective obstacle would be lower than the allowable minimum distance to an obstacle, this deviation from the target state is communicated using coherent stimuli. The distance between the boundaries of the area of interest AOI and the respective obstacle is an example of the current state of the area of interest AOI. The allowable minimum distance to an obstacle is an example of the target state.

An increase in deviation from the target state, such as a decrease of the distance between the boundaries of the area of interest and an obstacle, in particular below the minimum distance, may result in an increase in the magnitude and/or frequency of the coherent stimuli for communicating the deviation.

The embodiment of FIG. 3B differs from the embodiment of FIG. 3A in that the selected set comprises an additional entity 3. The above description of FIG. 3A is correspondingly valid for FIG. 3B. The first entity of the three entities of the selected set corresponds to the person 1 that is to be assisted and the second entity corresponds to a physical object 2 associated with the person 1. The third entity corresponds to a further person 3 associated with the person 1, wherein the further person 3 is schematically shown from a Birdseye's view as a circle. The further person 3 helps the person 1 with handling the physical object 2.

As shown in FIG. 3B the area of interest AOI encompasses the person 1, the physical object 2 and the further person 3, i.e. each entity of the set. The area of interest AOI is greater than the area formed by the shapes of the person 1, the physical object 2 and the further person 3. The area of interest AOI of FIG. 3B is greater than the area of interest AOI of FIG. 3A because of the additional third entity. The shape of the area of interest AOI of FIG. 3B is only by way of example and is not limiting the present disclosure. The physical object 2 and the further person 3 expands the physical space that is occupied by the person 1 in the environment, wherein said expanded physical space is represented by the area of interest AOI.

Figure 4C:
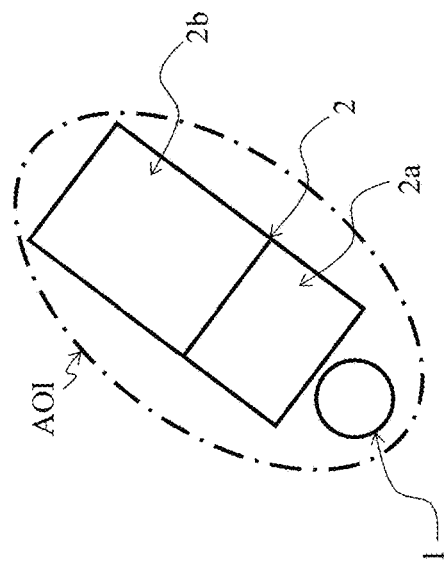
FIGS. 4A, 4B and 4C schematically show an area of interest determined by a method according to an embodiment of the present disclosure.
Figure 4B:
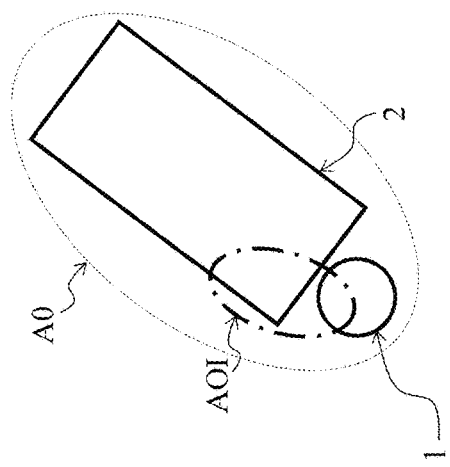
Figure 4A:
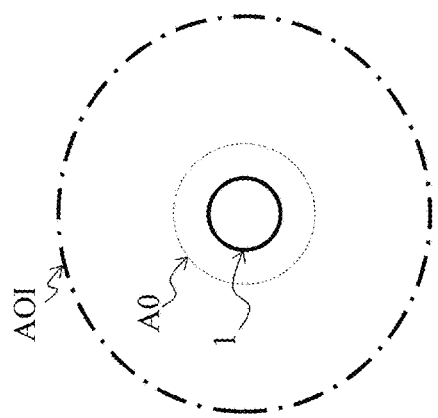

FIGS. 4A, 4B and 4C schematically show an area of interest determined by a method according to an embodiment of the present disclosure. In the FIGS. 4A, 4B and 4C the different entities are schematically shown by geometrical objects, such as circles, rectangles, from a Birdseye's view. The shape of the area of interest AOI in FIGS. 4A, 4B and 4C is only by way of example and is not limiting the present disclosure. In particular, the form of the area of interest AOI in FIGS. 4A, 4B and 4C may be different compared to the form that is shown (elliptic).

According to the embodiment of FIG. 4A the selected set comprises one entity, which is the person 1 to be assisted. The area of interest A0 which is determined on the basis of the estimated location and shape of the person 1 is indicated by the thin dashed circle A0 around the circle 1 indicating the person 1.

According to the embodiment of FIG. 4A, the area of interest AOI is determined on the basis of the estimated location and shape of the person 1 and additional information, wherein the additional information defines an additional safety area to be added to the boundaries of the area of interest A0. As a result, the area of interest AOI (indicated by the thick dotted and dashed circle AOI) determined on the basis of the estimated location and shape of the person 1 and the additional information is greater than the area of interest A0 that is determined without the additional information. The additional area between the area of interest A0 and the area of interest AOI corresponds to the additional safety area.

As shown in FIG. 4A, the area of interest AOI encompasses the person 1. The area of interest AOI is greater than the area formed by the shape of the person 1 due to the additional safety area added. The embodiment of FIG. 4A allows a safety distance to be maintained to other persons e.g. to prevent spread of a disease.

The additional safety area may be dependent on a probability estimation of a risk, e.g. an infection risk with a disease, for the person. Thus, in a section of the environment with a lower risk, the additional safety area may be smaller and, thus, the area of interest AOI encompassing the person 1 may be smaller. As a result, the person is allowed to move closer to other person before a deviation from the target state is communicated, in case the target state corresponds to a minimum distance to an obstacle, such as another person, or to no contact of the area of interest with an obstacle, such as another person.

In addition, factors that may influence the probability of infection would have an effect on the additional safety area and, thus, on the area of interest AOI and the allowable distance between the person and other persons. Examples of such factors are the interaction history of the person with other persons, the interaction history of other person in the environment, the availability of protective equipment, such as face masks, and the air flow in the environment.

An increase in deviation from the target state, such as a decrease of the distance between the boundaries of the area of interest and an obstacle, in particular below a minimum distance, may result in an increase in the magnitude and/or frequency of the coherent stimuli for communicating the deviation.

According of FIG. 4B the selected set comprises two entities, which are the person 1 to be assisted and a physical object 2 associated with the person 1, such as a box being handled by the person. The area of interest A0, which is determined on the basis of the estimated location and shape of the person 1 and the estimated location and shape of the physical object 2, is indicated by the thin dashed circle A0 around the circle 1 indicating the person 1.

According to the embodiment of FIG. 4B the area of interest AOI is determined on the basis of the estimated location and shape of the person 1, the estimated location and shape of the physical object 2 and additional information. The additional information defines one or more parts of the person 1 and the physical object 2 to be excluded for determining the area of interest AOI. For example, the area of interest may encompass only the arm and hand of the person 1 and the part of the physical object, which is in contact to the hand and arm of the person 1 for handling the physical object 2. As a result, the area of interest AOI determined on the basis of the estimated location and shape of the person 1, the estimated location and shape of the physical object 2 and the additional information is smaller than the area of interest A0 that is determined without the additional information.

As shown in FIG. 4B the area of interest AOI encompasses a part of the person 1 and a part of the physical entity 2, i.e. a part of each entity of the set. The area of interest AOI is smaller than the area formed by the shape of the person 1 and the shape formed by the physical object 2 associated with the person 1 due to the additional information defining parts of the person 1 and the physical object 2 to be excluded for determining the area of interest AOI.

FIG. 4C basically corresponds to FIG. 3A. Therefore, reference is made to the description of FIG. 3A for describing the FIG. 4C and in the following mainly the difference between the embodiment of FIG. 4C and the embodiment of FIG. 3A is discussed.

The embodiment of FIG. 4C differs from the embodiment of FIG. 3A in that the object 2 associated with the person 1 is a combination of a physical object 2a and a virtual object 2b. For example, the shape of the object 2 may correspond to the shape of a physical vehicle (real vehicle), wherein the shape of the physical object 2a is smaller than the shape of the physical vehicle and the virtual object expands the extents of the physical object 2a to the extents of the physical vehicle. Thus, it is possible for the person 1 to simulate the physical vehicle driving in the environment by using the physical object 2a that is combined with the virtual object 2b. Namely, the area of interest AOI is determined on the basis of the estimated location and shape of each of the person 1, the physical object 2a and the virtual object 2b. Thus, there is not difference between the aforementioned area of interest and the area of interest of the physical vehicle. Alternatively, the object 2 may correspond to a mere virtual object, wherein the shape of the virtual object corresponds to the shape of a physical object, such as a physical vehicle.

In both cases, the person may use the object 2, corresponding to a virtual object or a combination of a physical object and a virtual object, for planning paths for a large vehicle without maneuvering and potentially damaging the large vehicle, wherein the object 2 resembles the shape and, thus, the form and size of the large vehicle.

As shown in FIG. 4C the area of interest AOI encompasses the person 1 and the object 2, in particular the combination of the physical object 2a and the virtual object 2b. That is, the area of interest AOI encompasses each entity of the set. The area of interest AOI is greater than the area formed by the shapes of the person 1 and the object 2. The object 2 expands the physical space that is occupied by the person 1 in the environment, wherein said expanded physical space is represented by the area of interest AOI.

Figure 5B:
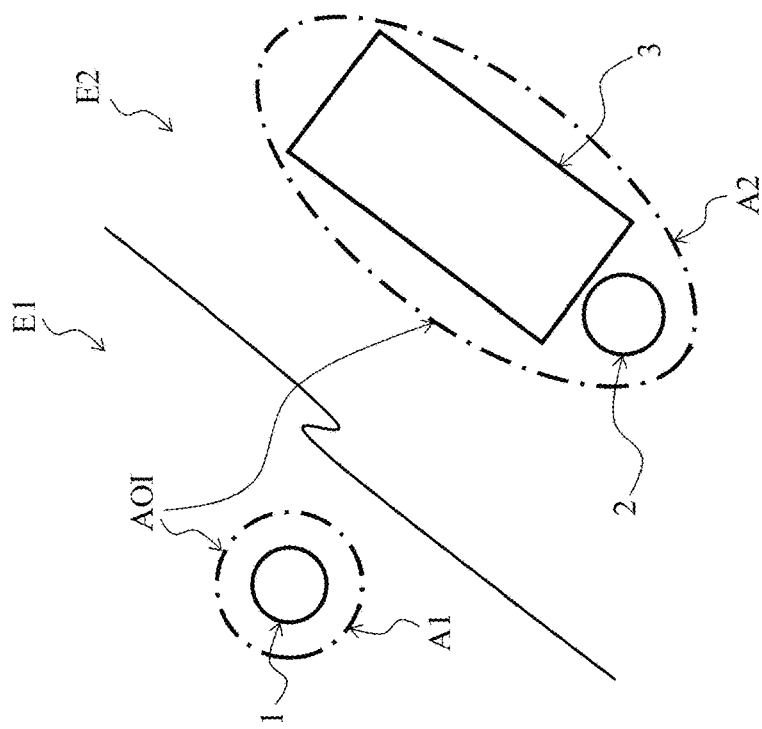
FIGS. 5A and 5B schematically show an area of interest determined by a method according to an embodiment of the present disclosure.
Figure 5A:
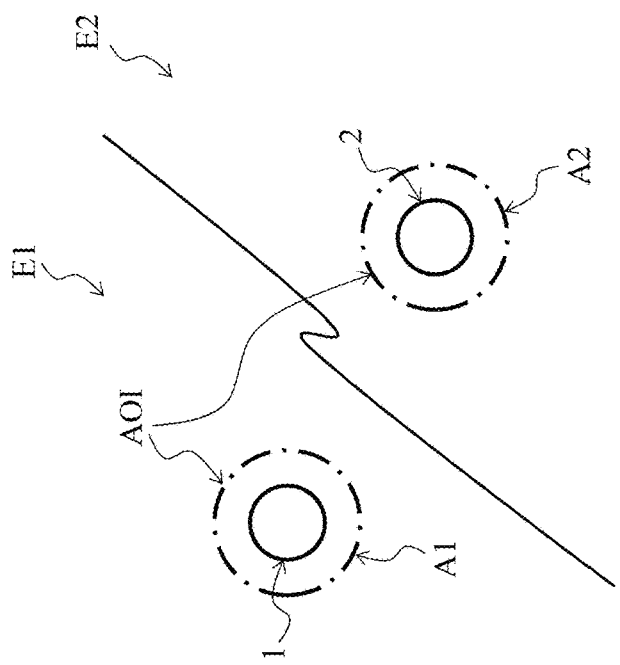

FIGS. 5A and 5B schematically show an area of interest determined by a method according to an embodiment of the present disclosure. In the FIGS. 5A and 5B the different entities are schematically shown by geometrical objects, such as circles, rectangles, from a Birdseye's view. The shape of the area of interest in FIGS. 5A and 5B is only by way of example and is not limiting the present disclosure. In particular, the form of the area of interest in FIGS. 5A and 5B may be different compared to the form that is shown (elliptic and circular).

According to the embodiment of FIG. 5A the selected set comprises two entities 1 and 2 in an environment. The environment comprises the first environment E1 around the first entity 1 and the environment E2 around the second entity 2. The first entity of the two entities corresponds to the person 1 that is to be assisted, which is schematically shown from a Birdseye's view as a circle. The second entity corresponds to a physical object 2 associated with the person 1, which is schematically shown from a Birdseye's view as a circle. The physical object 2 is present in the second environment E2 that is different to the first environment, in which the person is present. For example, the physical object 2 may be a robot that is teleoperated by the person 1. Thus, the person 1 present in the first environment E1, such as a control center, may control from the distance the robot 2 that is present in a second environment E2, such as a construction site, in order to use the robot 2 for performing a task in the second environment E2. For example, the robot may perform tasks that are too dangerous to be performed by a person.

In this case, it is important for the person 1 to be aware not only of the first environment E1, but also of the second environment E2. Therefore, as shown in FIG. 5A, the area of interest AOI is determined on the basis of the location and shape of each of the person 1 and the physical object 2 such that the area of interest AOI encompasses the person 1 and the physical object 2. That is, the area of interest AOI encompasses each entity of the set. The area of interest AOI is greater than the area formed by the shapes of the person 1 and the physical object 2. The size of the area of interest AOI may be different, as long as the area of interest AOI encompasses each entity of the set. FIG. 5A shows an example of the case, in which the area of interest AOI comprises sub-areas A1, A2 that are disjoint and, thus, do not form a continuous area. Namely, a first sub-area A1 of the area of interest AOI encompasses the person 1 in the first environment E1 and a second sub-area A2 of the area of interest AOI encompasses the physical object 2 in the second environment E2. The physical object 2 expands the physical space that is occupied by the person 1 in the environment comprising the environment E1 and environment E2. Said expanded physical space is represented by the area of interest AOI.

As a result, the method according to the embodiment of FIG. 5A allows to give feedback to the person 1 with regard to the current state of the person 1 and the current state of the physical object 2. For example, the current state may correspond to a distance between the boundaries of the area of interest AOI and an obstacle in the first environment E1 or second environment E2. As shown in FIG. 5A, the area of interest AOI comprises boundaries in the first environment E1 and boundaries in the second environment E2. The target state may correspond to a minimum distance to an obstacle. Thus, in case the distance between the boundaries of the area of interest AOI around the person 1 in the first environment E1 and an obstacle in the first environment E1 becomes smaller than the minimum distance, this will result in a deviation between the current state of the area of interest AOI and the target state. This deviation from the target state is then communicated to the person 1 using coherent stimuli for stimulating the person's body. In case the distance between the boundaries of the area of interest AOI around the physical object 2 in the second environment E2 and an obstacle in the second environment E2 becomes smaller than the minimum distance, this will also result in a deviation between the current state of the area of interest AOI and the target state. This deviation from the target state is then communicated to the person 1 using coherent stimuli for stimulating the person's body.

Thus, the person 1 is warned by the method using coherent stimuli, in case in the first environment E1 the person 1 gets too close to an obstacle of the first environment E1 or in case the physical object 2 being teleoperated by the person 1 gets too close to an obstacle of the second environment.

An increase in deviation from the target state, such as a decrease of the distance between the boundaries of the area of interest and an obstacle, in particular below an allowable minimum distance, may result in an increase in the magnitude and/or frequency of the coherent stimuli for communicating the deviation.

The embodiment of FIG. 5B differs from the embodiment of FIG. 5A in that the selected set comprises an additional entity 3. The above description of FIG. 5A is correspondingly valid for FIG. 5B. The first entity of the three entities of the selected set corresponds to the person 1 that is to be assisted and the second entity corresponds to a physical object 2, such as a robot, that is teleoperated by the person 1. The third entity corresponds to a further physical object 3 associated with the person 1, wherein the further physical object 3 is present in the second environment E2. The further object 3 is controlled by the person 1 in that the person 1 teleoperates the robot 2 to handle the physical object 3.

As shown in FIG. 5B the area of interest AOI encompasses the person 1, the physical object 2 and the further physical object 3, i.e. each entity of the set. The area of interest AOI is greater than the area formed by the shapes of the person 1, the physical object 2 and the further physical object 3. The area of interest AOI of FIG. 5B is greater than the area of interest of FIG. 5A as a result of the additional third entity. The physical object 2 and the further physical object 3 expand the physical space that is occupied by the person 1 in the environment comprising the environment E1 and environment E2. This expanded physical space is represented by the area of interest AOI.

Figure 6:
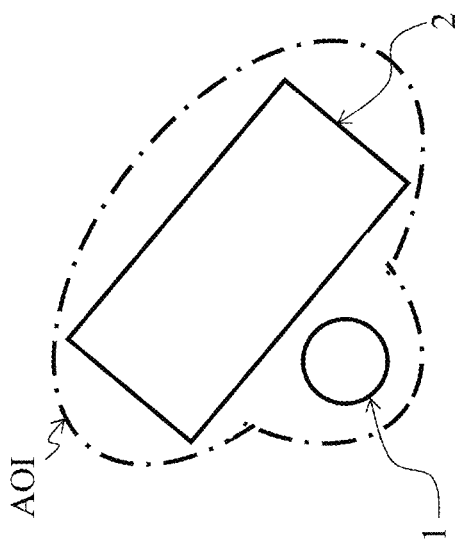
FIG. 6 schematically shows a change of the area of interest determined by a method according to an embodiment of the present disclosure.
Figure 6:
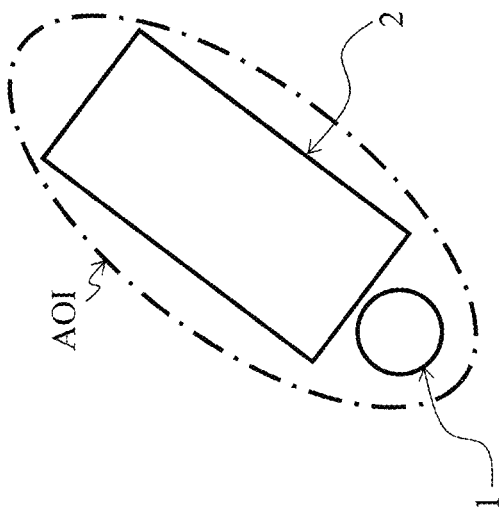

FIG. 6 schematically show a change of the area of interest determined by a method according to an embodiment of the present disclosure.

FIG. 6 shows that a dynamic reconfiguration of the one or more entities of the selected set may be performed by the method of the present disclosure. As shown in FIG. 6, the selected set comprises two entities that correspond to the person 1 and an object 2 associated with the person 1, such as e.g. a box being carried. The way the person carries the box may be changed for example from carrying the box longitudinal (shown on the left side of FIG. 6) to carrying the box diagonally (shown on the right side of FIG. 6). As a result, in case of such a change, the area of interest may be determined again on the basis of the estimated location and shape of the physical object 2, wherein the orientation of the physical object 2 with respect to the person 1 has changed.

Figure 7:
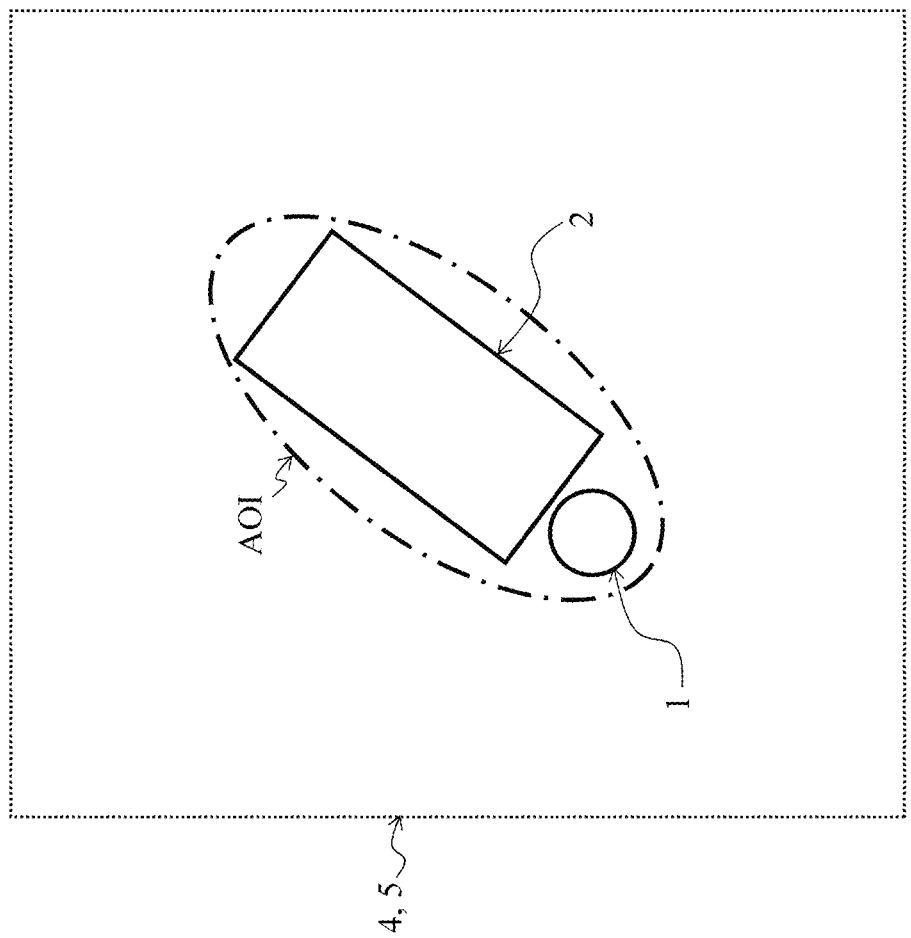
FIG. 7 schematically shows an area of interest determined by a method according to an embodiment of the present disclosure.

FIG. 7 schematically shows an area of interest determined by a method according to an embodiment of the present disclosure.

The embodiment of FIG. 7 differs from the embodiment of FIG. 3A in that according to the embodiment of FIG. 7 an area 4, such as a tracking area of a position tracking system is defined and the method is used for communicating to the person, in case the person 1 or the physical object 2 leaves the area 4. The area 4 comprises boundaries 5.

That is, in this case the target state of the area of interest AOI corresponds to the area of interest AOI being within the area 4 or within a range of the area 4. Therefore, as long as the area of interest AOI is within the area 4, there is no deviation between the current state of the area of interest AOI and the target state. However, as soon as a part of the area of interest AOI leaves the area 4, this result in a deviation of the current state of the area of interest AOI and the target state. Thus, this deviation is communicated to the person 1 using coherent stimuli for stimulating the person's body.

The characteristics, such as the magnitude (amplitude), frequency and/or pattern, of the coherent stimuli may be dependent on the deviation from the target state. That is, the greater the deviation from the target state, the greater the magnitude and/or frequency of the coherent stimuli may be.

The place of the person's body, to which the coherent stimuli are applied to for communicating the deviation from the target state, may depend on the location in the environment and direction with respect to the person 1 of occurrence of the deviation between the current state of the area of interest and the target state. That is, in case a deviation from the target state occurs in front of the person, the coherent stimuli may be applied to the person's body such that the stimuli relate to the front side of the person's body. For example, the coherent stimuli, e.g. tactile and/or visual stimuli, may be applied to the front side of the person's body. In case a deviation from the target state occurs behind the person, the coherent stimuli may be applied to the person's body such that the stimuli relate to the backside of the person's body. For example, tactile stimuli may be applied to the backside of the person's body. Visual stimuli may be applied to the person's body such that the deviation is shown near a visual representation of the person's back.

In case a deviation from the target state occurs on one side of the person, the coherent stimuli may be applied to the one side of the person's body etc.

Figure 8:
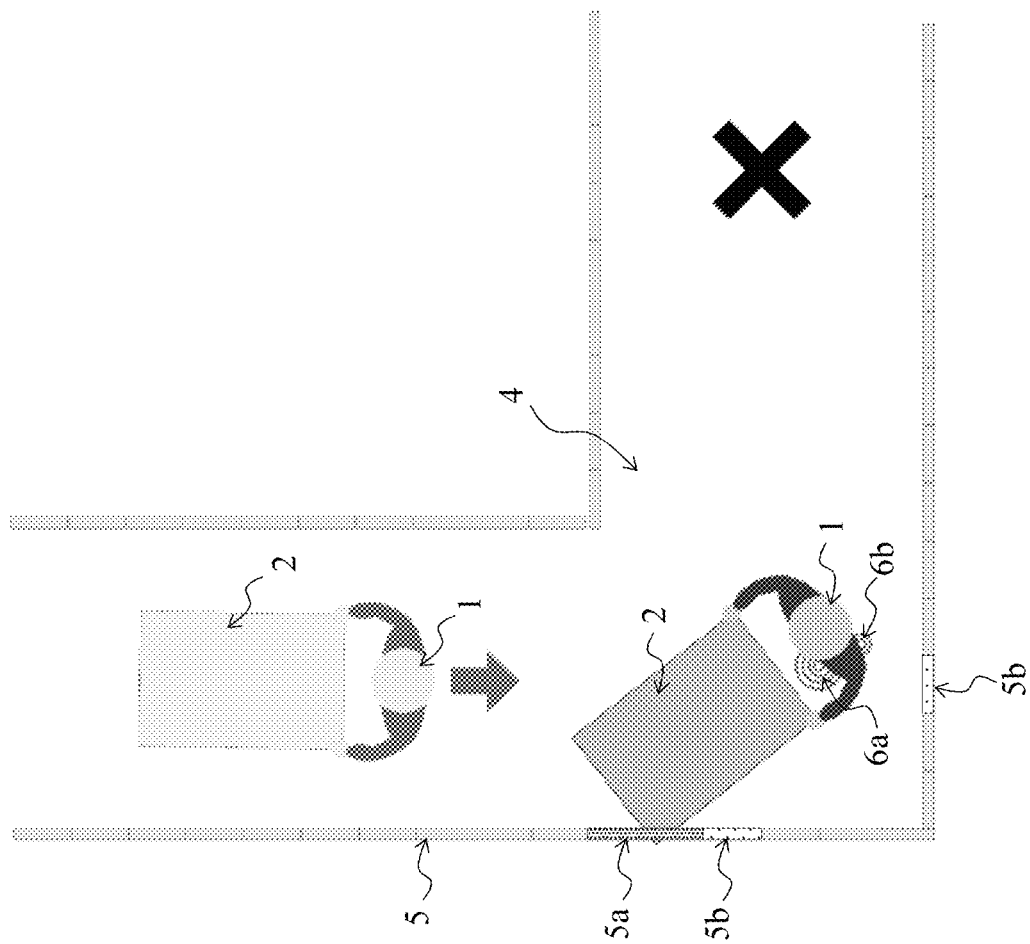
FIG. 8 schematically shows a situation, in which a method according to an embodiment of the present disclosure assists a person in assessing an environment.

The aforementioned is shown in FIG. 8.

FIG. 8 schematically shows a situation, in which a method according to an embodiment of the present disclosure assists a person in assessing an environment.

The embodiment of FIG. 8 corresponds to the embodiment of FIG. 7 showing a situation in which a deviation of the current state of the area of interest from the target state occurs. The above description with respect to FIG. 7 is also valid for FIG. 8.

In FIG. 8 the area of interest AOI encompassing the person 1 and the physical object 2 associated with the person 1 is not shown. As shown in FIG. 8, the physical object is a box that is carried by the person, wherein the person 1 moves backwards. The area 4 defines a tracking area of a position tracking system, wherein the area of interest should stay within the area 4. That is, as soon as the area of interest surpasses a boundary 5 of the area 4, a deviation between the current state of the area of interest and the target state occurs.

Such a deviation is indicated in FIG. 8. It is caused by the person turning at the corner of the area 4 to the right in the direction of the "x", which marks a destination of movement. Namely, at the boundary section 5a the box 2 exceeds the boundary 5 of the area 4. At the boundary sections 5b, the area of interest but not the box exceeds the boundary 5 of the area 4. In both cases, the area of interest exceeds the boundaries 5 of the area 4 and, thus, a deviation from the target state occurs. The target state is assumed to be that the area of interest is within the area 4 respectively within the boundaries 5 of the area 4.

The deviation from the target state in the case of the box 2 exceeding the boundary 5 at the section 5a is greater compared to the deviation from the target state in case the area of interest, but not the box 2 or the person 1, exceeding the boundary 5 at the section 5b. Thus, the magnitude and/or frequency of the coherent stimuli for communicating the deviation from the target state in the case of the box 2 exceeding the boundary 5 is greater compared to the magnitude and/or frequency of the coherent stimuli for communication the second case of deviation, as shown in FIG. 8.

Additionally, as shown in FIG. 8, the place of the person's body, to which the coherent stimuli are applied to for communicating the deviation from the target state, may depend on the location in the environment and direction with respect to the person of occurrence of the deviation between the current state of the area of interest and the target state. Because of the deviation form the target state occurring at the boundary section 5a in front of the person and on the left side, respective coherent stimuli 6a (e.g. tactile stimuli) are applied to the front left side of the person 1, as shown in FIG. 8. Because of the deviation from the target state occurring at the boundary section 5b behind the person and on the left side, respective coherent stimuli 6b (e.g. tactile stimuli) are applied to the left backside of the person 1, as shown in FIG. 8. As outlined already above, the magnitude and/or frequency of the coherent stimuli applied to the front left side of the person 1 is greater than the magnitude and/or frequency of the coherent stimuli applied to the left backside. Namely, the deviation from the target state at the boundary section 5a in front of the person 1 is greater than the deviation from the target state at the boundary section 5b behind the person 1.

In case of applying visual stimuli to the person's sensory system for vision for communicating a deviation from the target state, the boundaries 5 of the area 4 may be displayed to the person. The boundaries 5 may be highlighted at the sections, at which a deviation from the target state occurs, as shown in FIG. 8.

What is claimed is:

1. A method for assisting a person in assessing an environment comprising:
   selecting a set of two or more entities present in the environment;
   obtaining coordinates in the environment and extents of each entity of the set;
   estimating a location and shape of each entity of the set on the basis of the obtained coordinates and extents of the respective entity;
   determining an area of interest on the basis of the estimated location and shape of each entity of the set, wherein the area of interest encompasses at least a part of each entity of the set;
   evaluating the area of interest with respect to one or more variables of interest in order to evaluate a deviation between a current state of the area of interest and a target state; and
   communicating the deviation from the target state to the person using coherent stimuli for stimulating the person's body.

2. The method according to claim 1 comprising:
   determining the area of interest on the basis of the estimated location and shape of each entity of the set and additional information.

3. The method according to claim 2, wherein
   the additional information defines an additional safety area to be added to boundaries of the area of interest.

4. The method according to claim 3, wherein
   the additional safety area is dependent on a probability estimation of a risk, such as an infection risk with a disease, for the person.

5. The method according to claim 2, wherein
   the additional information defines one or more parts of one or more entities of the set to be excluded for determining the area of interest.

6. The method according to claim 2, wherein
   the additional information defines external factors of the environment comprising at least one of airflow, presence or level of physical protection of the set, and location history of the set.

7. The method according to claim 1, wherein
   the two or more entities of the set are the person,
   one or more objects associated with the person, and
   one or more further persons associated with the person.

8. The method according to claim 7, wherein
   the environment comprises
     a first environment around the person,
     a second environment around the one or more objects associated with the person, and
     a third environment around the one or more further persons associated with the person.

9. The method according to claim 1, wherein
   the two or more entities of the set are at least one of one or more physical entities and one or more virtual entities.

10. The method according to claim 1, wherein
    the one or more variables of interest comprise at least one of
       a distance between boundaries of the area of interest and an obstacle, such as a further entity, in the environment,
       a deviation of the area of interest from a tracking area of a position tracking system, and
       a deviation of the area of interest from an area of one or more characteristics, such as available wireless data.

11. The method according to claim 1, wherein
    selecting of the set is performed manually by the person or automatically.

12. The method according to claim 1, wherein
    the coherent stimuli comprise at least one of the following stimuli:
    visual stimuli,
    tactile stimuli,
    auditory stimuli,
    electromagnetic stimuli,
    chemical stimuli, and
    heat stimuli.

13. A system for assisting a person in assessing an environment, wherein the system comprises:
    a processing unit, configured to select a set of two or more entities present in the environment;
    a sensor unit comprising one or more sensors, wherein the sensor unit is configured to obtain coordinates in the environment and extents of each entity of the set,
    wherein the processing unit is configured to
       estimate a location and shape of each entity of the set on the basis of the obtained coordinates and extends of the respective entity,
       determine an area of interest on the basis of the estimated location and shape of each entity of the set, wherein the area of interest encompasses at least a part of each entity of the set, and
       evaluate the area of interest with respect to one or more variables of interest in order to evaluate a deviation between a current state of the area of interest from a target state; and
    a communication unit, configured to communicate the deviation from the target state to the person using coherent stimuli for stimulating the person's body.

14. The system according to claim 13, wherein
    the communication unit comprises one or more actuator elements of at least one of the following types: vibrotactile actuator, pressure-applying actuator, light emitter, loud speaker, electrode, induction coil, chemical emitter/agent, and heating element.

15. The system according to claim 13, wherein
    the coherent stimuli are coherent tactile and visual stimuli and the communication unit comprises:
       a display unit, optionally wearable by the person, for outputting the visual stimuli of the coherent tactile and visual stimuli, and
       a tactile actuator unit, optionally wearable by the person, for outputting the tactile stimuli of the coherent tactile and visual stimuli.

16. The system according to any one of claim 13, wherein
    the sensor unit is an optical tracking system.

17. A method for assisting a person in assessing an environment comprising:
    selecting a set of one or more entities present in the environment;
    obtaining coordinates in the environment and extents of each entity of the set;
    estimating a location and shape of each entity of the set on the basis of the obtained coordinates and extents of the respective entity;
    determining an area of interest on the basis of the estimated location and shape of each entity of the set and additional information, wherein the area of interest encompasses at least a part of each entity of the set, and wherein the additional information defines an additional safety area to be added to boundaries of the area of interest, and wherein the additional safety area is dependent on a probability estimation of a risk for the person;

evaluating the area of interest with respect to one or more variables of interest in order to evaluate a deviation between a current state of the area of interest and a target state; and communicating the deviation from the target state to the person using coherent stimuli for stimulating the person's body.

18. The method according to claim 17, wherein the probability estimation of the risk for the person is a probability estimation of an infection risk with a disease for the person.

\* \* \* \* \*